A. W. RIGGS.
MAIL CARRIER.
APPLICATION FILED JULY 24, 1908.

912,979.

Patented Feb. 16, 1909.
6 SHEETS—SHEET 3.

Witnesses:
Eile W. Miller
R. H. Orwig

Inventor: Albert W. Riggs,
By Thomas G. Orwig their attys.

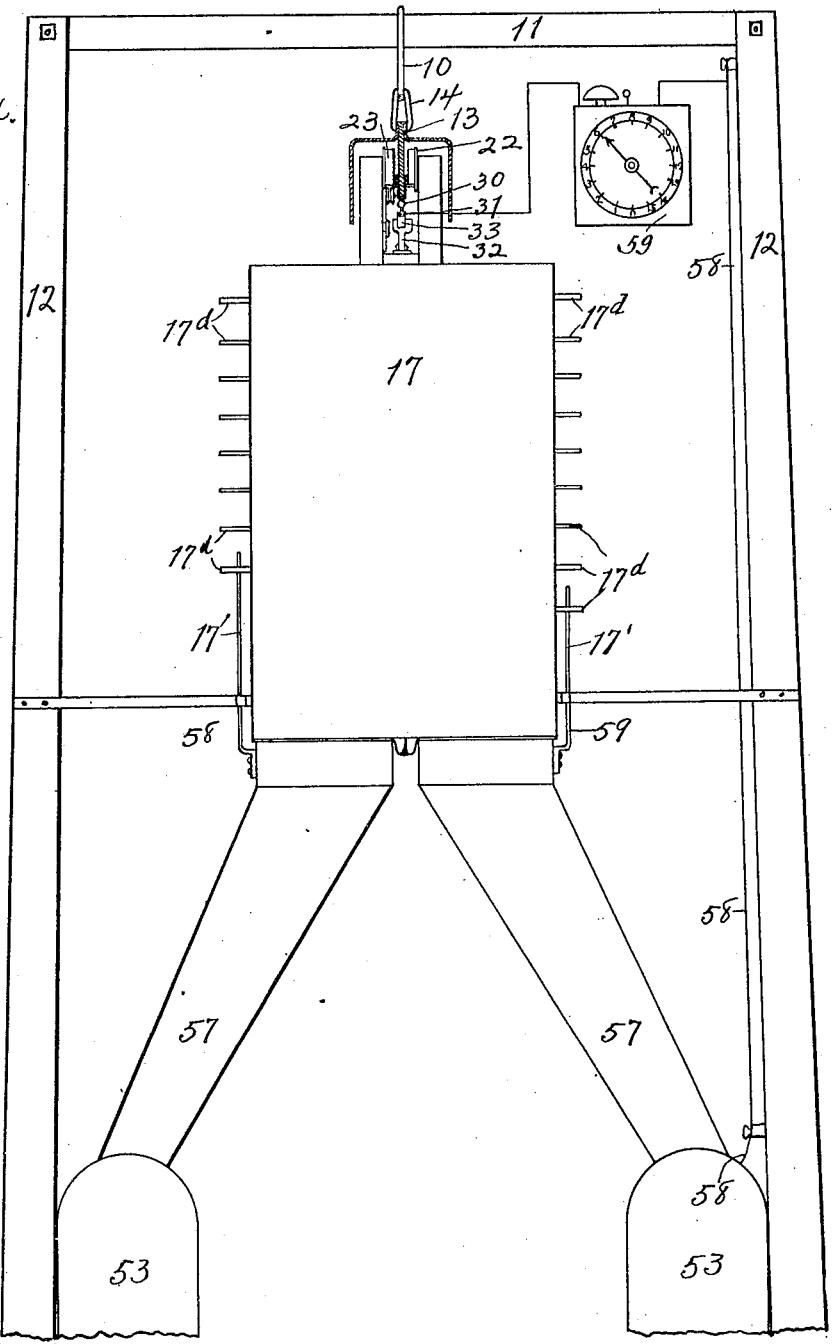

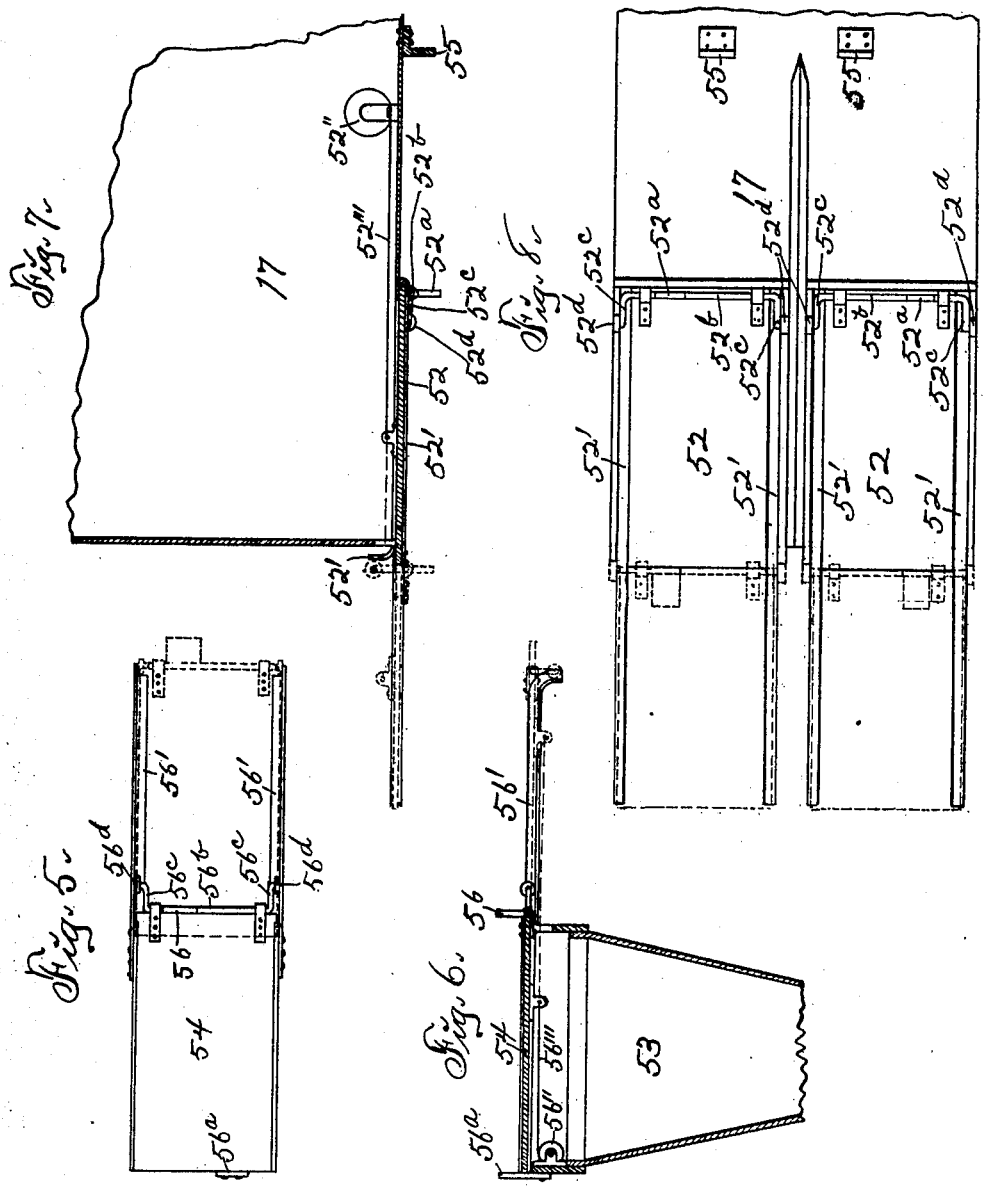

A. W. RIGGS.
MAIL CARRIER.
APPLICATION FILED JULY 24, 1908.
912,979.
Patented Feb. 16, 1909.
6 SHEETS—SHEET 6.
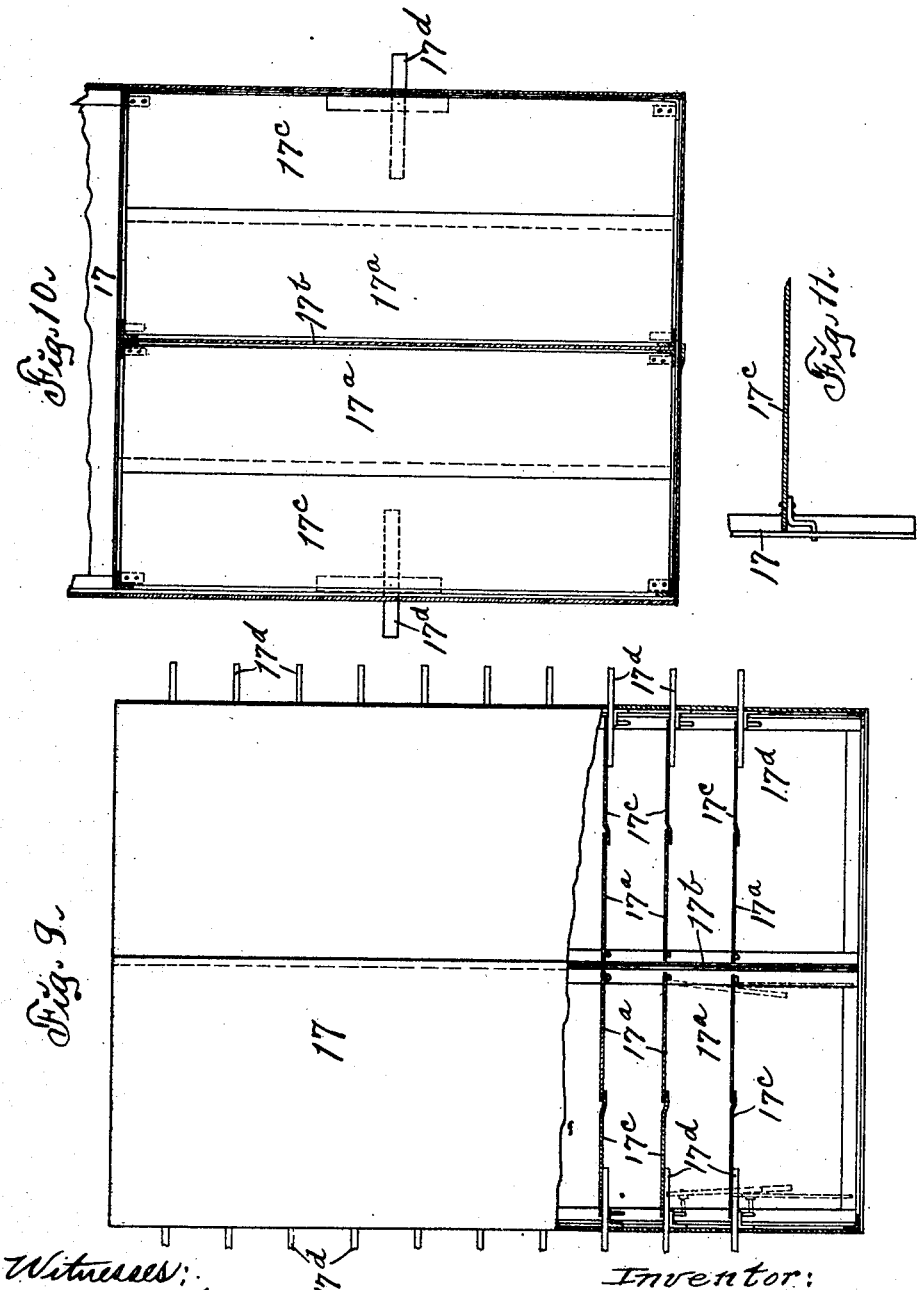

UNITED STATES PATENT OFFICE.

ALBERT W. RIGGS, OF ATLANTIC, IOWA, ASSIGNOR OF FORTY ONE-HUNDREDTHS TO JACOB O. FUDGE, CHARLES R. HUNT, AND C. L. CAMPBELL, ALL OF ATLANTIC, IOWA.

MAIL-CARRIER.

No. 912,979.　　　Specification of Letters Patent.　　　Patented Feb. 16, 1909.

Application filed July 24, 1908. Serial No. 445,419.

*To all whom it may concern:*

Be it known that I, ALBERT W. RIGGS, citizen of the United States, residing at Atlantic, in the county of Cass and State of Iowa, have invented a new and useful Mail-Carrier, of which the following is a specification.

The object of this invention is to provide an automatic means and mechanism for carrying, delivering and collecting mail.

A further object of this invention is to provide an automatic mechanism and means for carrying, delivering and collecting mail on a circuit such as is illustrated in the modern free rural delivery route.

My invention consists in the provision of an electric circuit, a track, a car adapted to travel on said track, a motor carried by said car and adapted to be driven by said electric circuit, stations throughout the length of said track and circuit, means at each station for receiving mail from said car, means at each station for causing the car to deliver mail into the receiving means, means at each station for delivering mail to said car, and means at each station for causing said car to receive such mail.

My invention consists further in the provision of means for automatically decreasing the speed of the car adjacent and at the stations served thereby.

My invention consists further in the provision of means for receiving mail from a car.

My invention consists further in the provision of means for delivering mail to a car.

My invention consists further in the construction of a car adapted to convey mail automatically throughout a circuit.

My invention consists further in the construction of a car adapted to deliver mail automatically at various stations throughout a circuit.

My invention consists further in the construction of a car adapted to receive mail at various stations throughout a circuit.

My invention consists further in the construction of a car adapted to be self-propelled throughout a circuit, and also adapted to deliver mail at various stations on said circuit and receive mail from such stations.

My invention consists further in the construction, arrangement and combination of elements hereinafter set forth, pointed out in my claims and illustrated in the accompanying drawing, in which—

Figure 1:
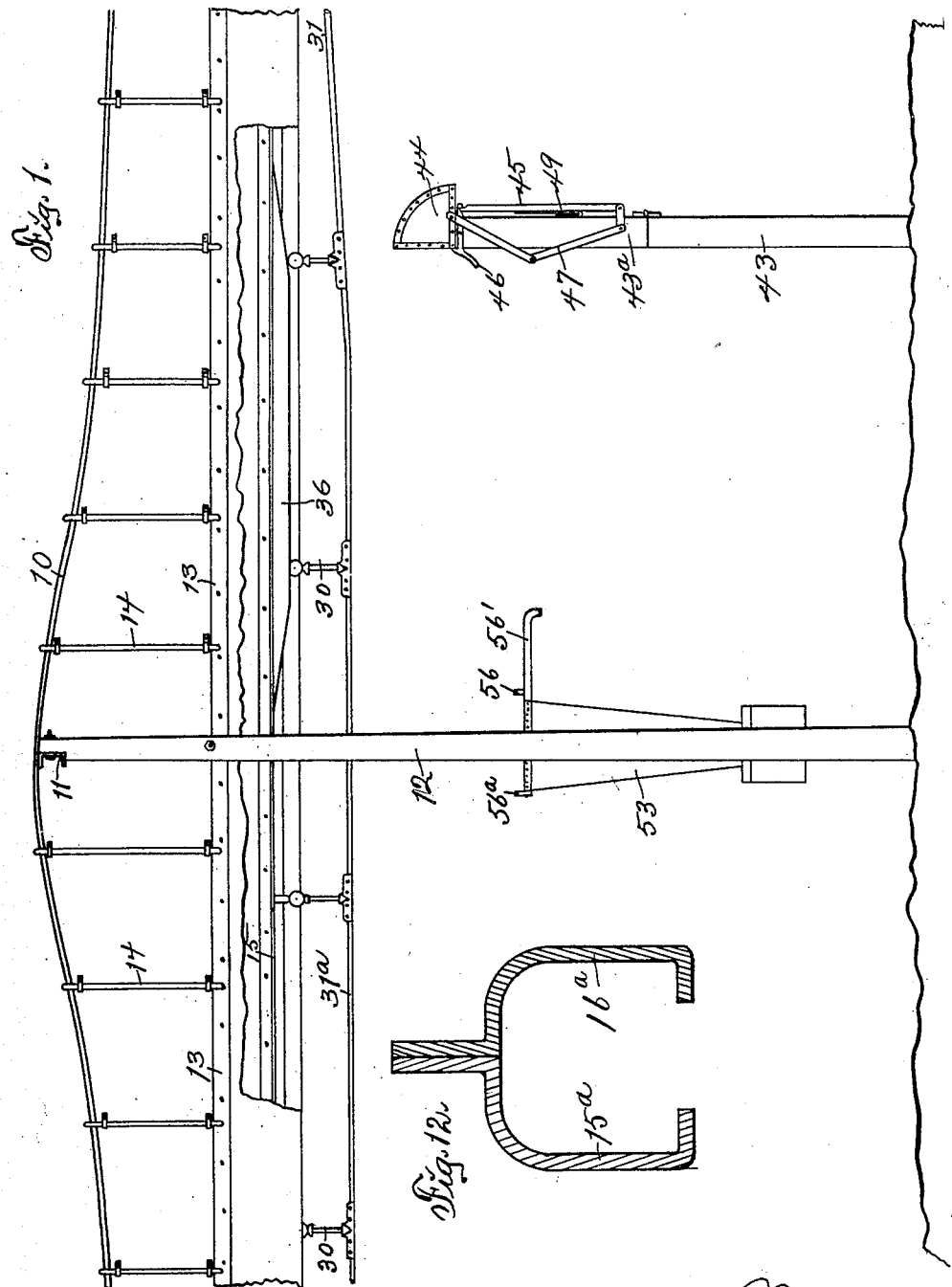
Figure 2:
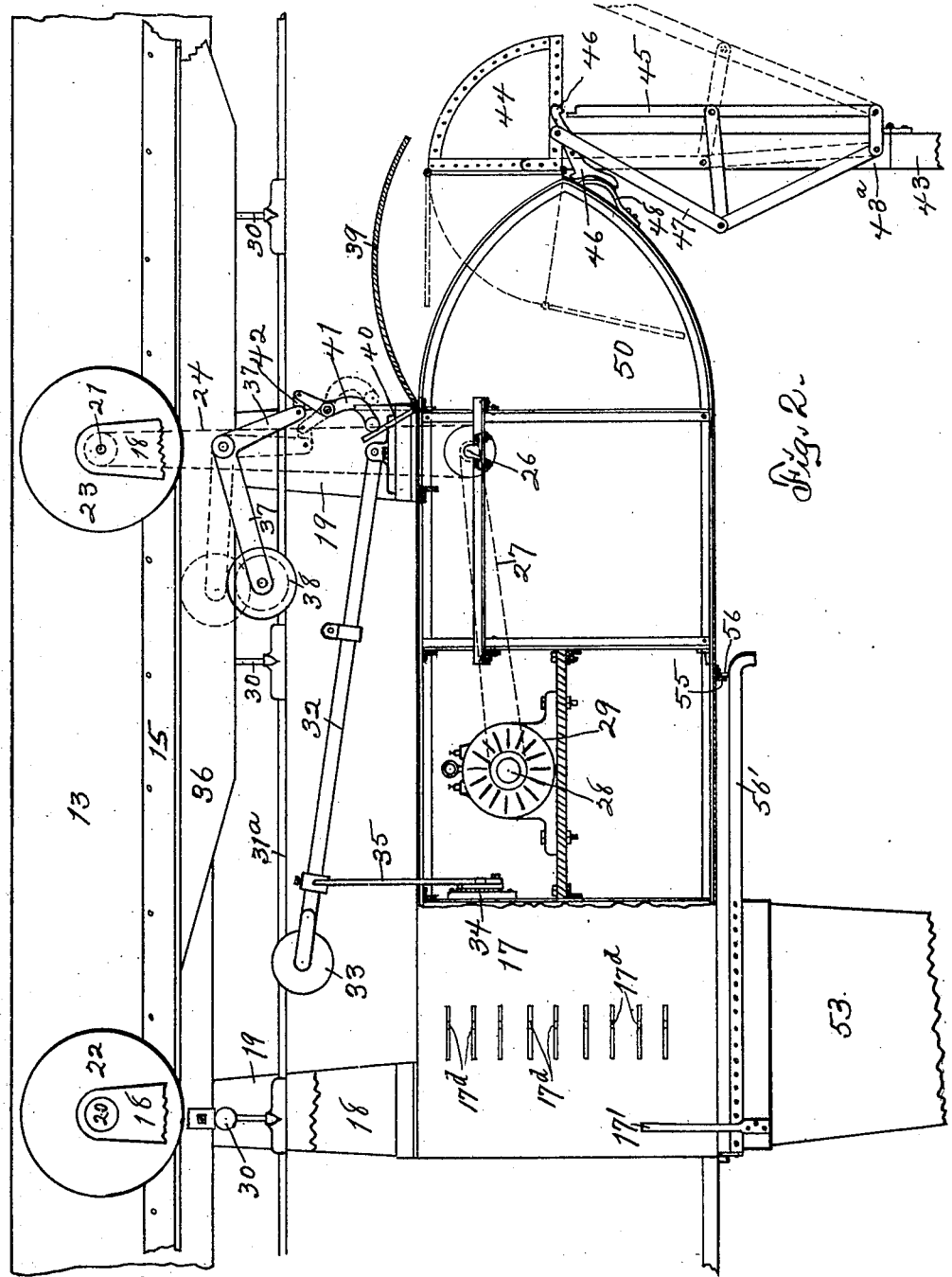
Figure 3:
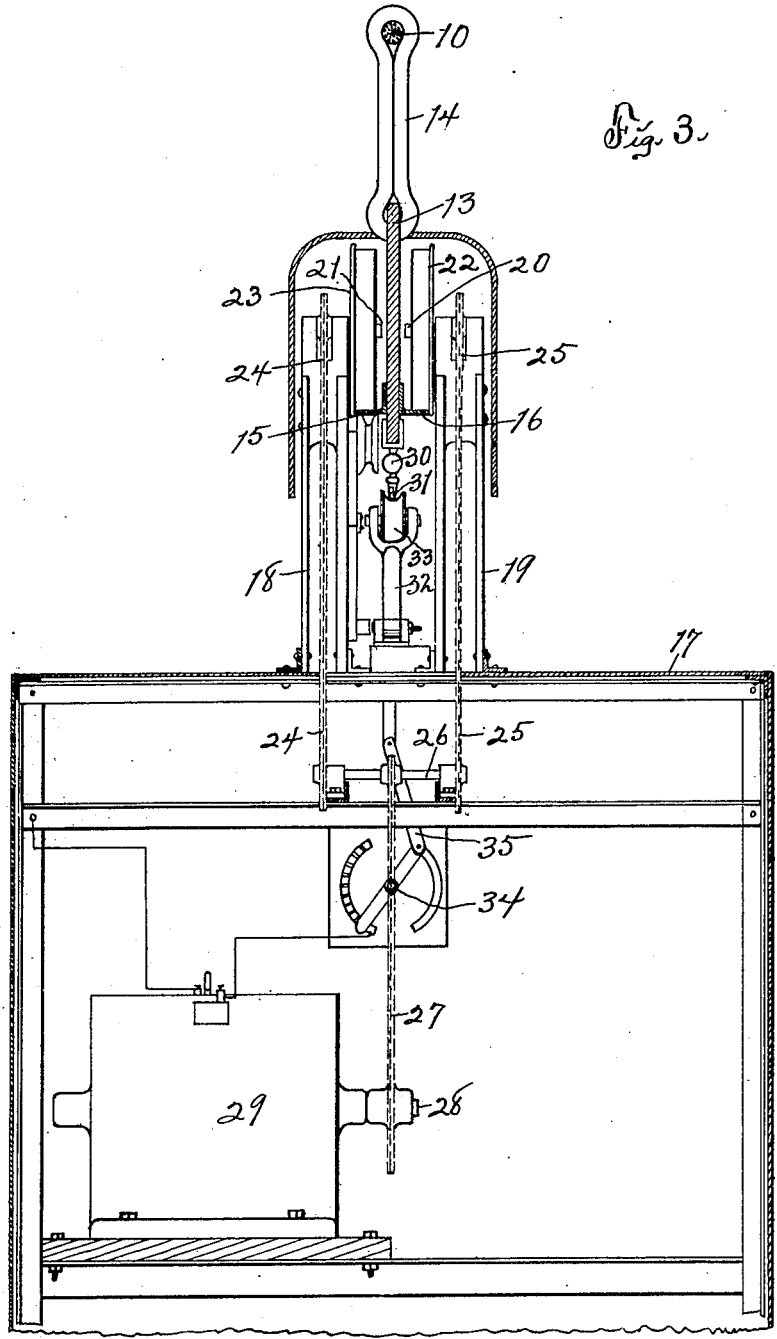

Figure 1 is a side elevation illustrating the construction of a track, trolley conductor, mail receiver and mail deliverer at an adjacent station. Fig. 2 is a detail side elevation illustrating a portion of a track, a car suspended thereon, a trolley conductor, trolley connections between said car and conductor, a mail receiver and a mail deliverer at and adjacent to a station. Fig. 3 is a cross-section illustrating a portion of a track, a trolley conductor, a car suspended from the track, and means for driving said car on said track. Fig. 4 is a cross-section illustrating a track, means for supporting the track, a trolley conductor, a car suspended from said track, and a plurality of mail receivers that may be located at a station. Fig. 5 is a plan of one of the mail receivers. Fig. 6 is a vertical section of the elements shown in Fig. 5. Fig. 7 is a side elevation of the lower portion of a mail-carrying car, partly in section. Fig. 8 is a bottom plan of the elements shown in Fig. 7. Fig. 9 is a plan, partly in section, of a mail-carrying car. Fig. 10 is a detail of said car. Fig. 11 is a further detail of a portion of the car. Fig. 12 is a cross-section illustrating a modified form of track for the car.

In the construction of the apparatus as shown, the numeral 10 designates a cable adapted to be supported on cross-bars 11 arranged at suitable distances of separation and carried by posts 12, either singly or in pairs. A bar 13 is suspended from the cable 10 by hangers 14, and said bar preferably is level, or inclined to the nearest approximation to level permitted by the surface over which it extends. Angle-bars 15, 16 are mounted on and fixed to the lower portion of the bar 13 and project in opposite directions therefrom. The angle-bars 15, 16 form a continuous track throughout the length of the circuit designed to be served by this apparatus. A car 17 is provided, and standards 18, 19 are fixed to and rise from said car in pairs adjacent the front and rear ends of the car. Shafts 20, 21 are mounted for rotation in upper end portions of the standards 18, 19, and flanged track-wheels 22, 23 are fixed to inner end portions of said shafts and ride on the track flanges of the angle-bars 15, 16. The shafts 20, 21 are connected by sprocket gearing 24, 25 to a countershaft 26 journaled within the car 17, and said countershaft is connected by sprocket gearing 27 to the shaft 28 of a motor 29 also located within said car.

Insulated hangers 30 are fixed to and depend from the lower margin of the bar 13, and a trolley conductor 31 is supported by said hangers and is adapted to form a circuit electrically from a source of supply such as a dynamo, at the initial station. A trolley-arm 32 is hinged to the upper portion of the car 17, and a trolley-wheel 33 on said arm contacts with the conductor 31. A rheostat 34 is mounted in the car 17 and is connected by a rod 35 to the trolley-arm 32 adjacent the wheel 33. It will be observed that at points throughout the length of the circuit the trolley conductor 31 is dropped slightly into a plane below that normally occupied and at a greater distance of separation from the track-bars 15, 16, as at 31$^a$ in Figs. 1 and 2. This is for the purpose of causing the trolley-wheel 33 to depress the arm 32 and cause the rod 35 to actuate the rheostat 34 in such manner as to cut off and diminish the power supplied by the conductor to the motor 29 and lessen the speed of travel of said car at such points. Deflectors 36 are located at each station point adjacent the depressed portions 31$^a$ of the trolley conductor and are fixed to the track sections 15, 16. A bell-crank lever 37 is fulcrumed on one end of the standards 18, and a wheel 38 is mounted in one end of said lever and travels in contact with the lower face of the track sections 15 except at the stations, and at such stations said wheel is engaged by the deflectors 36 and depressed (Fig. 2), to the end of oscillating the lever 37 in one direction.

The car 17 is formed with a semi-circular front end portion, the lower half of which is rigid, and the upper half is formed as a door 39. The door 39 is formed with a flange or arm 40 at and projecting upward from its rear end, and the rear end portion of said door is hinged to the top of the car. A lever 41 is fulcrumed on the standard 18, and one arm thereof is in rolling engagement with the flange or arm 40, while the other arm of said lever is connected by a link 42 to the short arm of the bell-crank lever 37. Thus, when the lever 37 is oscillated in one direction by engagement of the wheel 38 with the deflector 36, the link 42 oscillates the lever 41 and causes said lever to move the arm or flange rearwardly and lift the door 39. At each station is located a post 43 having an upper member 43$^a$ hinged to its top and adapted to be moved in one direction therefrom. A box 44 is pivoted to the top of the upper member 43$^a$ of the post and normally is held in a given position by gravity and by a toggle lever 47. A trigger 46 is pivoted to the post and engages an arm 45 pivoted at its lower end to the lower end of the member 43$^a$. The trigger 46 holds the door of the box 44 normally closed. The toggle-lever 47 is connected to the box 44, to the arm 45 and member 43$^a$ and the trigger 46 projects into the path of travel of the car 17. As the car 17 approaches the post 43 the door 39 is lifted as described, and a lug 48 on the lower portion of the forward end of the car engages and trips the trigger 46, thus releasing said trigger from the arm 45 and permitting a spring 49 to act on the toggle-lever 47 and throw the box 44 forwardly and upwardly and open the door thereof, to the end of depositing mail matter from said box 44 into a receptacle 50 in the forward portion of the car. The car 17 is provided with compartments arranged parallel with each other on opposite sides of the center of the car. Each compartment is provided with a separate door 52 slidingly mounted on the car and covering and closing the bottom of the compartment. The posts 12 at the stations may carry receiving boxes 53, and each box is provided with a door 54 slidingly mounted across its top. As the car approaches a box 53, a lug 55 on the bottom of the car 17 in advance of the door 52 engages a lug 56 on the door 54 and moves said door forwardly. Then a lug 56$^a$ on the box 53 engages a lug 52$^a$ on the door 52 and moves the door 52 rearwardly, and an opening is thus made communicating between a given compartment in the car and the top of the box 53, through which opening mail matter can drop from the compartment in the car into a box.

The lug 56 is carried by a shaft 56$^b$ journaled on the door 54 and crank arms 56$^c$ on said shaft carry rollers 56$^d$ riding on guides 56'. The forward ends of the guides 56' curve downward and permit the rollers 56$^d$ to move downward and tilt the lug 56 forward (dotted lines Fig. 6) out of the path of travel of the lug 55. Thereupon a spring-actuated drum 56'', in the box 53 and connected by a wire 56''', to the door 54, draws said door back and closes the box. The lug 52$^a$ is carried by a shaft 52$^b$ journaled on the door 52 and crank arms 52$^c$ on said shaft carry rollers 52$^d$ riding on guides 52'. The central portions of the guides 52' curve upward and permit the rollers 52$^d$ to move upward and permit the lug 52$^a$ to tilt away from and out of engagement with the lug 56$^a$. Thereupon a spring-actuated drum 52'', in the car 17 and connected by a wire 52''' to the door 52, draws said door forward and closes the bottom of the box. Shelves are formed in each compartment by members 17$^a$, one above the other, extending slightly more than half way across a compartment and pivoted at their inner margins to a partition 17$^b$ longitudinally of the center of the car 17, and other members 17$^c$ pivoted to one side of the car and extending across the center of the compartment and overlapping beneath and supporting the first members. The members 17$^c$ normally are supported by bars 17$^d$ journaled between their ends on and beneath the members and extending through slots in the sides of the car. Mail matter is deposited on the various shelves at the initial station. A selection is made in relation to given stations and given compartments of the car by arranging the bars $17^d$ on the car at different elevations and arranging arms $17'$ on the posts 12 at corresponding elevations. For instance, at the first station the lowermost bar $17^d$ would be acted upon by the shortest arm $17'$ of the series; at the second station the next higher bar $17^d$ would be acted upon by the next higher arm $17'$ of the station series; and so on, until at the last station served by this apparatus the uppermost car bar would be acted upon by the uppermost arm of the station series. This arrangement implies or necessitates the distribution of the mail on the various shelves of the car in such manner that it will be dropped successively on the bottom door to be delivered by opening of such door at successive stations. It is to be understood however that the mail delivering apparatus carried by the post 43 is the same at each station, and is acted upon by and delivers mail to the car in the same manner throughout the series of stations served by this apparatus.

In Fig. 4 I have illustrated the location of boxes 53 on opposite sides of the vertical plane of the track and travel of the car 17 and communicating with the compartments of the car through tubes 57 diverging to said boxes. In Fig. 4 I also show arms $17'$ carried by upper portions of the tubes or spouts 57 and adapted to act upon and open the shelves of the mail compartments in the car 17 at different elevations. This illustration is for the purpose of showing how boxes on opposite sides of a track may be caused to receive mail from the same car, and also how the compartments on opposite sides of the center of the car may deliver their contents. A conductor 58 is carried by the posts 12 and connects with an annunciator 59 of conventional form at the initial station and connects with the various station boxes 53. Circuit means are provided by the metal car construction, door 39, flange or lug 40, lever 41, link 42, lever 37 and wheel 38 to the deflectors 36 and track members 15. Thus a circuit may be made or completed at each contact of any part of a car 17 with any part of a box 53 or tube 57 that will electrically operate the annunciator and announce or record the arrival of the car at successive stations.

In Fig. 12 I show a modified form for the track in which bars $15^a$, $16^a$ have track flanges turned inwardly and extending toward each other.

While I have described the apparatus as applicable to the delivery of mail matter throughout a circuit, it is to be understood that I do not limit myself in its use, as it may be employed in delivering any character of packages.

I claim as my invention:

1. A mail carrier, comprising a track, a car mounted for travel on the track, a motor in said car, a trolley conductor carried by said track, said conductor spaced wider from said track at intervals, a trolley connecting said motor and conductor, said trolley adapted to be depressed at intervals by said conductor out of its normal position, a rheostat on the car, and a controller connecting said trolley and rheostat, whereby when said trolley engages a depressed portion of the conductor it will depress the controller and actuate the rheostat to reduce the power delivered to the motor.

2. A mail carrier, comprising a track formed with stations, a car mounted for travel on the track, said car formed with a door, lever mechanism on the car adapted to open said door at times, deflectors on the track at the stations adapted to actuate said lever mechanism to the opening of the door, a motor in the car, a conductor on the track and depressed at successive stations, a trolley on the car connecting said motor and conductor, a rheostat in the car, and a controller connecting said trolley and rheostat, whereby when the trolley is depressed at the stations by the conductor, the rheostat will cut off or diminish the amount of power furnished to the motor.

3. A mail carrier, comprising a track, a conductor carried by said track and depressed at stations, a car mounted for travel on said track, a motor on said car, a trolley connecting said motor and conductor adapted to be depressed by the conductor at stations, a controller on the car actuated by the trolley, when depressed at stations at intervals throughout said track, mail-receiving boxes located at said stations, inter-engaging connections between said boxes and car whereby the boxes and car are opened for the delivery of mail from the car to the boxes, mail-delivering boxes at said stations, and inter-engaging means on said car and boxes whereby the car is opened for the reception of mail from said boxes.

4. A mail carrier, comprising a track, a car mounted for travel on the track, a motor in said car, a trolley conductor carried by said track, said conductor spaced closer to the track at intervals, a trolley connecting said motor and conductor, said trolley adapted to be depressed at intervals by said conductor out of its normal position, a rheostat on the car, and a controller connecting said trolley and rheostat, whereby when said trolley engages a depressed portion of the conductor it will depress the controller and actuate the rheostat to reduce the power delivered to the motor, said car formed with a door, lever mechanism arranged to open said door at times and a deflector on said track adapted for engagement by said lever mechanism at times.

5. A mail carrier, comprising a track, deflectors at intervals throughout the length of said track, a car mounted for travel on the track, and provided with a door in its forward end, lever mechanism carried by said car and connected with said door and arranged for engagement with the successive deflectors to open said door, a station box mounted for oscillation in the path of travel of the car, co-acting means on the station box and car adapted to oscillate the box and deposit the contents thereof in the car when the car is opened, a conductor carried by the track and depressed at intervals adjacent the station boxes, a motor on the car, a trolley connecting said motor and conductor, said trolley adapted to be depressed by the depressed portions of the conductor, a rheostat on the car and a controller connecting said rheostat and trolley, whereby when the trolley is depressed it will depress the controller and actuate the rheostat to reduce the power delivered to the motor.

6. A mail carrier, comprising a track, a car mounted for travel on the track and provided with compartments and doors thereto, mail-receiving boxes arranged at intervals throughout the length of the track, co-acting means on the car and mail-receiving boxes whereby the doors of the car are opened in predetermined succession to deposit mail from the compartments into successive boxes, an annunciator, a circuit through the mail-receiving boxes, car and conductor to said annunciator when the car and boxes are in contact, the aforesaid conductor carried by the track and depressed at intervals adjacent the station or mail-receiving boxes, a motor on the car, a trolley connecting said motor and conductor and adapted to be depressed by the conductor, a rheostat on the car, and a controller connecting said rheostat and trolley.

7. The combination of a mail carrier, comprising a track, a car mounted for travel on said track, a conductor carried by the track, a motor on the car, trolley connections between said conductor and motor, mail receiving boxes arranged at intervals throughout the length of the track, contacting devices on said car and boxes, an annunciator and a circuit through the car, conductor, boxes and annunciator when said contacting devices are in contact.

ALBERT W. RIGGS.

Witnesses:
J. E. THARNISH,
C. A. MEREDITH.